United States Patent
Saen et al.

(10) Patent No.: US 7,152,131 B2
(45) Date of Patent: Dec. 19, 2006

(54) DATA PROCESSOR HAVING AN ACCESS SIZE CONTROL UNIT

(75) Inventors: Makoto Saen, Kokubunji (JP); Kei Suzuki, Kokubunji (JP)

(73) Assignee: Renesas Technology Corp., Tokyo (JP)

( * ) Notice: Subject to any disclaimer, the term of this patent is extended or adjusted under 35 U.S.C. 154(b) by 207 days.

(21) Appl. No.: 10/329,350

(22) Filed: Dec. 27, 2002

(65) Prior Publication Data

US 2003/0135684 A1    Jul. 17, 2003

(30) Foreign Application Priority Data

Jan. 15, 2002    (JP)    ............................ P2002-005680

(51) Int. Cl.
*G06F 13/40*   (2006.01)
*G06F 13/12*   (2006.01)
*G06F 13/14*   (2006.01)

(52) U.S. Cl. ......................................... 710/307; 710/66
(58) Field of Classification Search .................. 710/36, 710/39, 52, 65, 66, 307
See application file for complete search history.

(56) References Cited

U.S. PATENT DOCUMENTS

| | | | | |
|---|---|---|---|---|
| 4,447,878 A * | 5/1984 | Kinnie et al. | ............... | 710/307 |
| 4,716,527 A * | 12/1987 | Graciotti | ...................... | 703/25 |
| 4,766,538 A * | 8/1988 | Miyoshi | ...................... | 710/307 |
| 4,831,514 A * | 5/1989 | Turlakov et al. | ............... | 710/66 |
| 5,113,369 A * | 5/1992 | Kinoshita | .................... | 710/307 |
| 5,274,780 A * | 12/1993 | Nakao | ............................ | 710/107 |
| 5,363,494 A * | 11/1994 | Kudou | ......................... | 710/307 |
| 5,428,763 A * | 6/1995 | Lawler | ......................... | 710/307 |
| 5,446,845 A * | 8/1995 | Arroyo et al. | ............. | 710/307 |
| 5,537,659 A * | 7/1996 | Nakao | ......................... | 710/307 |
| 5,590,287 A * | 12/1996 | Zeller et al. | ................ | 710/307 |
| 5,802,399 A | 9/1998 | Yumoto et al. | | |
| 5,835,738 A * | 11/1998 | Blackledge et al. | ........ | 710/307 |
| 5,974,493 A * | 10/1999 | Okumura et al. | ........... | 710/307 |
| 6,311,248 B1 * | 10/2001 | Meiyappan et al. | ........ | 710/307 |
| 6,587,901 B1 * | 7/2003 | Nishikawa et al. | ......... | 710/100 |
| 6,681,314 B1 * | 1/2004 | Matsuo et al. | ............. | 711/212 |
| 6,697,921 B1 * | 2/2004 | Aoki | .......................... | 711/154 |
| 6,725,316 B1 * | 4/2004 | Gans | ........................... | 710/307 |

* cited by examiner

*Primary Examiner*—Paul R. Myers
*Assistant Examiner*—Ryan Stiglic
(74) *Attorney, Agent, or Firm*—Mattingly, Stanger, Malur & Brundidge, P.C.

(57) ABSTRACT

In a data processor including a master circuit that issues an access request and slave circuits that perform processing in response to the access request received from the master circuit, the disclosed invention enables the master circuit to access all data areas of the slave circuits even if the master circuit does not have an access command in data size suitable for accessing the slave circuit. An access size control unit that can convert access size input from the master circuit to data size in which the slave circuit accepts access is installed between the master circuit and the slave circuit. The access size control unit retains at least one address for access size setting. As the master circuit accesses the appropriate address for access size setting, the access size conversion procedure can be carried out.

9 Claims, 15 Drawing Sheets

```
L1:MOVE.W  BASEADR R10
L2:MOVE.W  DT64L R11
L3:MOVE.W  R11 @R10
L4:MOVE.W  DT64H R11
L5:MOVE.W  R11 @(R10+#4)
L6:MOVE.W  ADR64 R11
L7:MOVE.W  R11 @(R10+#16)
L8:MOVE.W  SDADR R12
L9:MOVE.W  R11 @R12
```

```
L1:MOVE.W  BASEADR R10
L2:MOVE.W  ADR64 R11
L3:MOVE.W  R11 @(R10+#16)
L4:MOVE.W  SDADR R12
L5:MOVE.W  @R12 R13
```

FIG. 7A

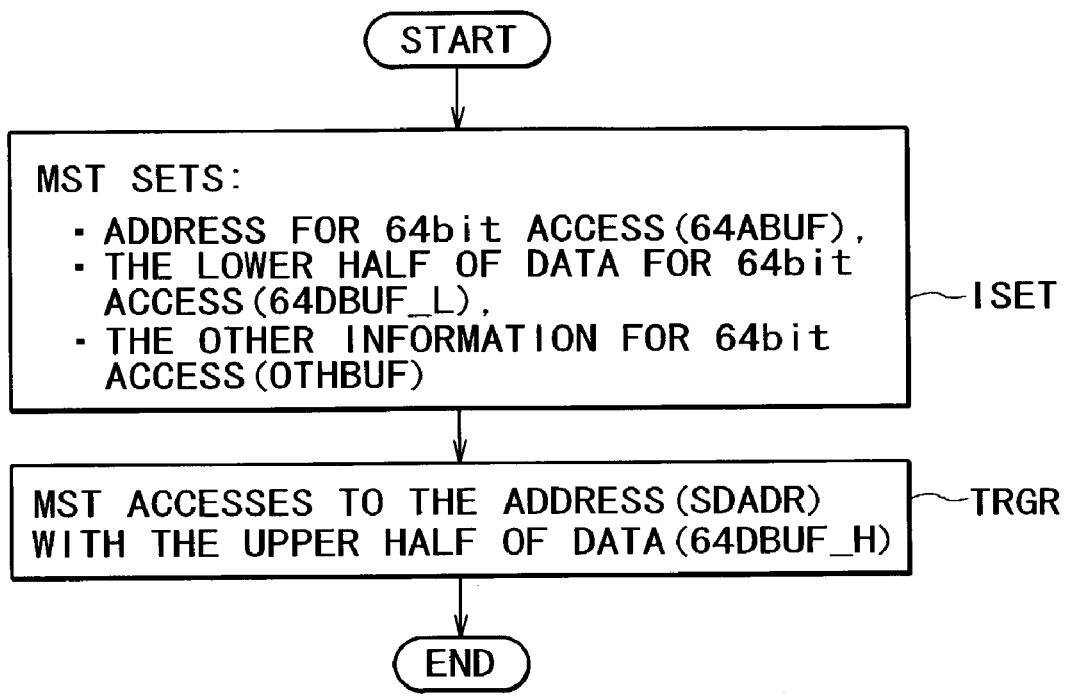

```
START
  ↓
MST SETS:
 · ADDRESS FOR 64bit ACCESS (64ABUF),
 · THE LOWER HALF OF DATA FOR 64bit
   ACCESS (64DBUF_L),
 · THE OTHER INFORMATION FOR 64bit
   ACCESS (OTHBUF)                        } — ISET
  ↓
MST ACCESSES TO THE ADDRESS (SDADR)
WITH THE UPPER HALF OF DATA (64DBUF_H)    — TRGR
  ↓
END
```

FIG. 7B

```
L1: MOVE.W  BASEADR  R10
L2: MOVE.W  DT64L    R11
L3: MOVE.W  R11      @R10
L4: MOVE.W  ADR64    R11
L5: MOVE.W  R11      @(R10+#4)
L6: MOVE.W  DT64H    R11
L7: MOVE.W  SDADR    R12
L8: MOVE.W  R11      @R12
```

FIG. 7C

```
L1: MOVE.W  BASEADR  R10
L2: MOVE.W  ADR64    R11
L3: MOVE.W  R11      @(R10+#16)
L4: MOVE.W  SDADR    R12
L5: MOVE.W  @R12     R13
```

FIG. 9A

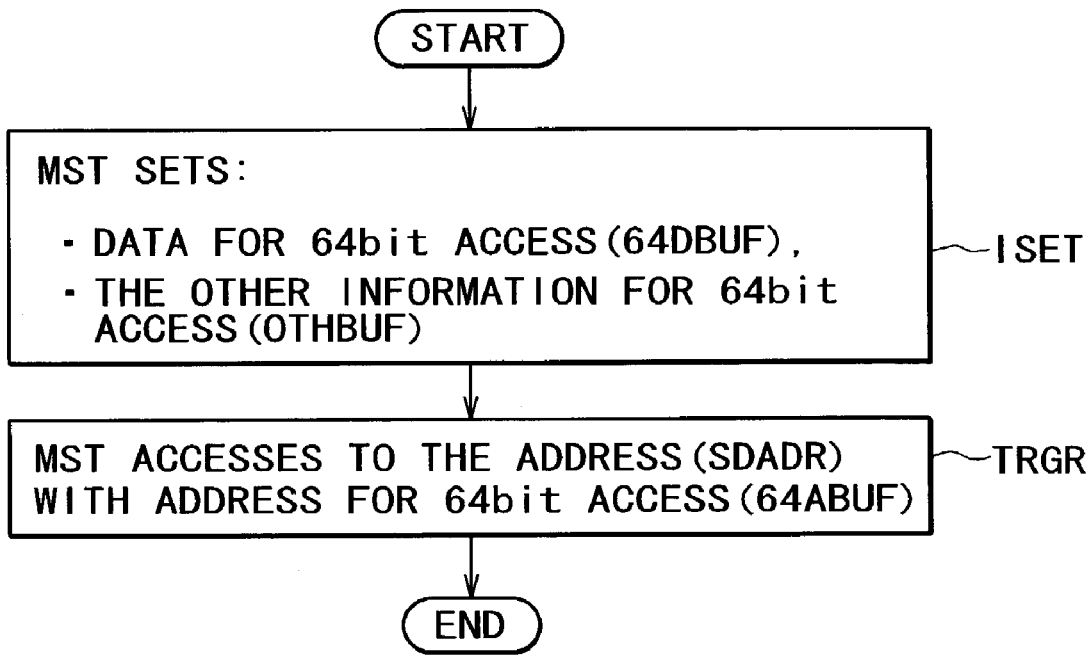

```
                START
                  │
                  ▼
┌─────────────────────────────────────┐
│ MST SETS:                           │
│                                     │──ISET
│  • DATA FOR 64bit ACCESS(64DBUF),   │
│  • THE OTHER INFORMATION FOR 64bit  │
│    ACCESS(OTHBUF)                   │
└─────────────────────────────────────┘
                  │
                  ▼
┌─────────────────────────────────────┐
│ MST ACCESSES TO THE ADDRESS(SDADR)  │──TRGR
│ WITH ADDRESS FOR 64bit ACCESS(64ABUF)│
└─────────────────────────────────────┘
                  │
                  ▼
                 END
```

FIG. 9B

```
L1:MOVE.W  BASEADR  R10
L2:MOVE.W  DT64L    R11
L3:MOVE.W  R11      @R10
L4:MOVE.W  DT64H    R11
L5:MOVE.W  R11      @(R10+#4)
L6:MOVE.W  ADR64    R11
L7:MOVE.W  SDADR    R12
L8:MOVE.W  R11      @R12
```

FIG. 9C

```
L1:MOVE.W  BASEADR  R10
L2:MOVE.W  ADR64    R11
L3:MOVE.W  R11      @(R10+#16)
L4:MOVE.W  SDADR    R12
L5:MOVE.W  @R12     R13
```

```
L1:MOVE.W  SDADR  R12
L2:MOVE.W  R11    @R12
L3:MOVE.W  BASEADR R10
L4:MOVE.W  DT64L  R11
L5:MOVE.W  R11    @R10
L6:MOVE.W  DT64H  R11
L7:MOVE.W  R11    @(R10+#4)
L8:MOVE.W  ADR64  R11
L9:MOVE.W  R11    @(R10+#16)
```

```
L1:MOVE.W  SDADR  R12
L2:MOVE.W  @R12   R13
L3:MOVE.W  BASEADR R10
L4:MOVE.W  ADR64  R11
L5:MOVE.W  R11    @(R10+#16)
```

F I G. 1 2
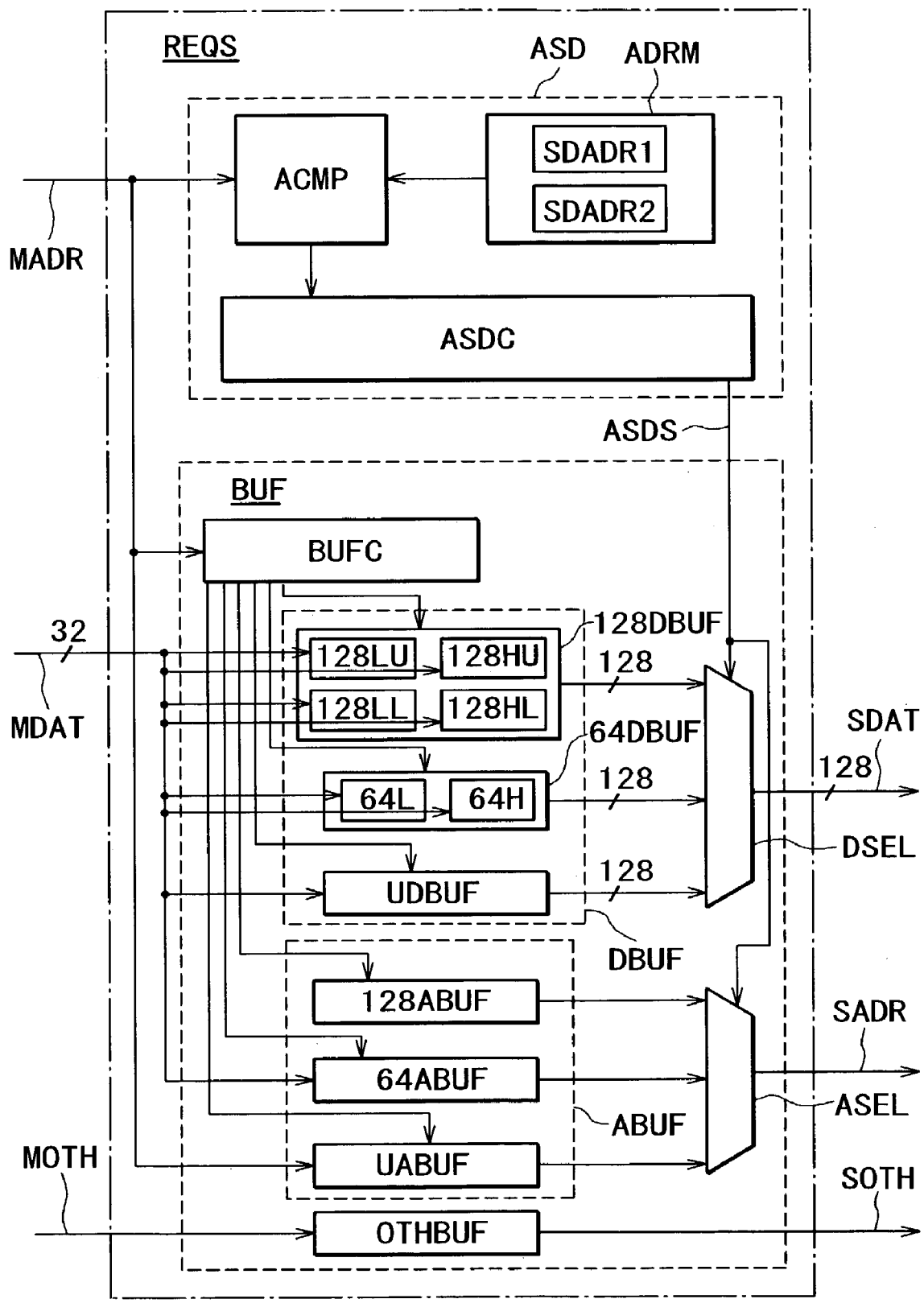

DATA PROCESSOR HAVING AN ACCESS SIZE CONTROL UNIT

BACKGROUND OF THE INVENTION

1. Field of the Invention

The present invention relates to a data processor including an access size control unit that converts an access size in an access request output from a master circuit to a slave circuit to a predetermined data size such that the slave circuit can accept the access request. The data processor according to the present invention is built on an LSI chip, or the like, and includes a processor such as a CPU, a digital signal processor (DSP) or an interface to a memory such as an SDRAM.

2. Description of the Related Art

For a recent data processor system that is built on a chip, the system includes a master circuit (bus master) and its slave circuits linked to the master circuit via an interfacing bus and data transfer is performed between the master circuit and the slave circuits, in compliance with pre-defined access requirements. Also, such system is required to incorporate other slave circuits that do not conform to initial design specifications. In some cases, a master circuit such as a CPU having 32-bit access size and a memory controller designed for data transfer to/from another master circuit such as a CPU having 64-bit access size are mounted on a same data processor system.

Heretofore, Access size incompatibility has been overcome by adding a command that makes the master circuit use a data size suitable for accessing the slave circuit or the access size of the slave circuit is modified.

Herein, a circuit that issues an access request to another circuit is referred to as a master circuit. In addition to circuits such as a CPU or DSP, image data processing circuits such as an MPEG decoder and a graphic accelerator also correspond to master circuits under this definition. Conversely, a circuit that receives an access request from another circuit and performs processing is referred to as a slave circuit. For example, a memory interface is a slave circuit.

To enhance the use efficiency of previously designed circuits, it is preferable to allow the circuits to be used without circuit modification. The reason is as follows. For short-term development of LSIs whose scale becomes larger and larger, it is preferable that LSI manufacturers use circuit modules that have been designed in-house and in their possession as their assets or purchased from an external source. By incorporating such modules into a new design LSI, the cost and work hours of design can be reduced. Such design assets are called Intellectual Properties (IPs). If the circuit modification needs to use the IPs when developing a system chip, the benefit of using the IPs is reduced. The inventors find a necessity for installing a master circuit and a slave circuit that have different access size with each other on a same data processor system without circuit modification of IPs.

SUMMARY OF THE INVENTION

In a data processor system including previously developed master and slave circuits, the present invention aims at enabling the master circuit to access the slave circuit even though the mater circuit does not have an access command in data size suitable for accessing the slave circuit.

To carrying out the invention, one preferred aspect of the invention resides in a data processor that includes a master circuit which issues an access request to another circuit, slave circuits which perform processing in response to the access request received from the master circuit, and an access size control unit being installed between the master circuit and the slave circuits, where in when the master circuit is accessing a slave circuit which accepts access in data size unsupported by the master circuit, the access size control unit issues a command to make an apparent data size suitable for accessing the slave circuit.

In another aspect, the access size control unit retains addresses for size for access size setting. As the master circuit accesses the appropriate address for size, the access size control unit enables conversion to an apparent access size in which the slave circuit accepts the access.

The invention makes it possible to install a master circuit and a slave circuit including an element that accepts only access in data size unsupported by the master circuit on a single data processor without modification of the circuit configuration of these circuits.

Other and further objects, features and advantages of the invention will appear more fully from the following description.

BRIEF DESCRIPTION OF THE DRAWINGS

FIG. 7A shows a flowchart of the procedure 2;

FIG. 7B is an example program for writing by the procedure of FIG. 7A;

FIG. 7C is an example program for reading by the procedure of FIG. 7A;

FIG. 9A shows a flowchart of the procedure 3;

FIG. 9B is an example program for writing by the procedure of FIG. 9A;

FIG. 9C is an example program for reading by the procedure of FIG. 9A;

FIG. 12 is a block diagram showing a further configuration example of the request controller REQS;

DETAILED DESCRIPTION OF THE PREFERRED EMBODIMENTS

Figure 1A:
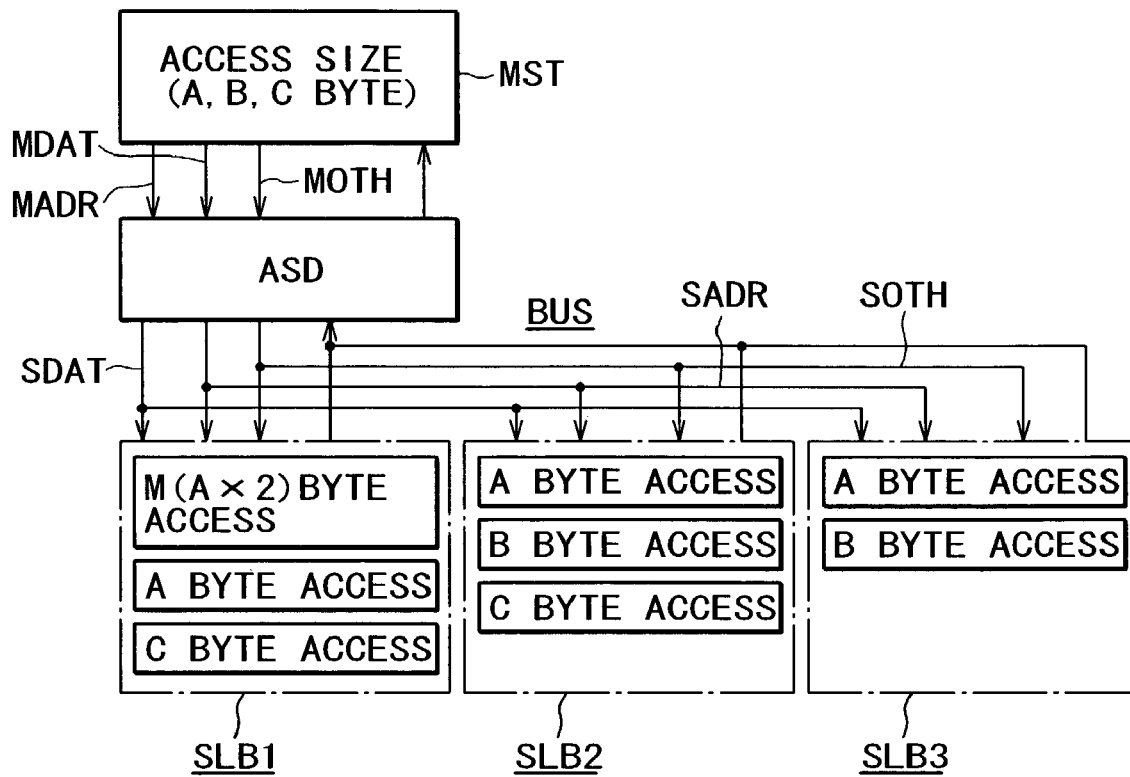
FIG. 1A is a conceptual drawing showing a data processor configuration for explaining the present invention.

FIG. 1A is a conceptual drawing showing a data processor configuration to which the present invention applies. In FIG. 1A, a master circuit MST is designed to have three access sizes: A bytes, B bytes, and C bytes. SLB1, SLB2, and SLB3 are slave circuits. The slave circuit SLB1 includes a first register whose access size is M bytes (=A bytes×2), a second register whose access size is A bytes, and a third register whose access size is C bytes. The slave circuit SLB2 includes a first register whose access size is A bytes, a second register whose access size is B bytes, and a third register whose access size is C bytes. The slave circuit SLB3 includes a first register whose access size is A bytes and a second register whose access size is B bytes.

The master circuit MST connects to the slave circuits SLB1, SLB2, and SLB3 via a bus circuit BUS. Because the master circuit MST does not have M bytes access size command, the master circuit MST cannot access the first register of the slave circuit SLB1 by a simple connection via the bus circuit BUS. Therefore, an access size control unit ASD is provided for overcome this problem. When the master circuit MST attempts to access the first register that exclusively allows access in Mbytes in slave circuit SLB1, the access size control unit ASD converts the access request from the master circuit MST to the access request in M bytes.

The bus circuit BUS section (the master side) from the access size control unit ASD to the master circuit MST includes the following lines: master side address MADR, master side data MDAT, master side other information MOTH and the return signal from the slave side. The bus circuit BUS section (the slave side) from the access size control unit ASD to the slave circuits SLB1 to SLB3 includes the following lines: slave side address SADR, slave side data SDAT, slave side other information SOTH and the return signal from the slave circuits.

Figure 1B:
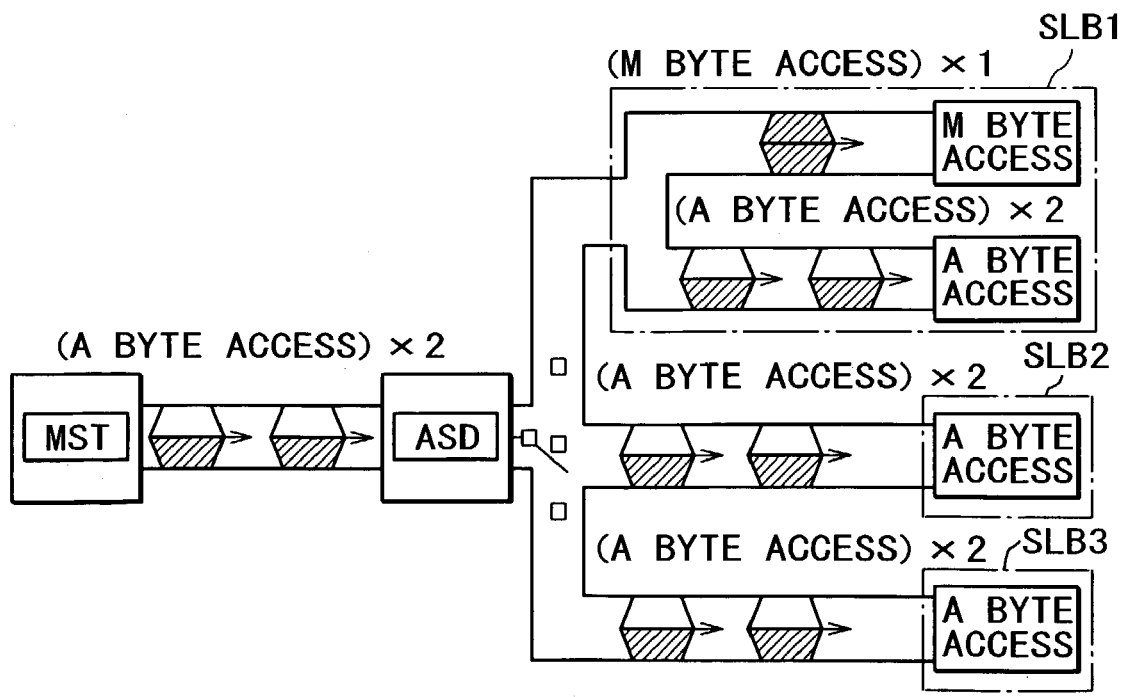
FIG. 1B is a schematic drawing explaining how data from the master circuit is handled for different slave circuits to be accessed.

FIG. 1B is a schematic drawing for explaining how two successive A bytes (equal to M bytes) of data from the master circuit MST are handled. The access size control unit ASD determines whether these data are a sequence of two A bytes or entirely M bytes in terms of data size of access and changes the switch connection accordingly. If the data is entirely M bytes, it is sent to the first register that exclusively allows access in M bytes in the slave circuit SLB1 as access in M bytes. If the data is a sequence of A bytes, they are sent to the second register that allows access in A bytes in the slave circuits SLB1 to SLB3.

According to the present invention, the master circuit MST is allowed to access a slave circuit SLB1 in M bytes without circuit modification of the slave circuit SLB1 or the master circuit MST. Using partially elaborated programming that two repetitions of A bytes may be regarded as M bytes in a specific occasion, the access size control unit ASD automatically handles access in M bytes. While M bytes equals A bytes×2 in this case, any byte arrangement may be possible where appropriate.

Figure 2:
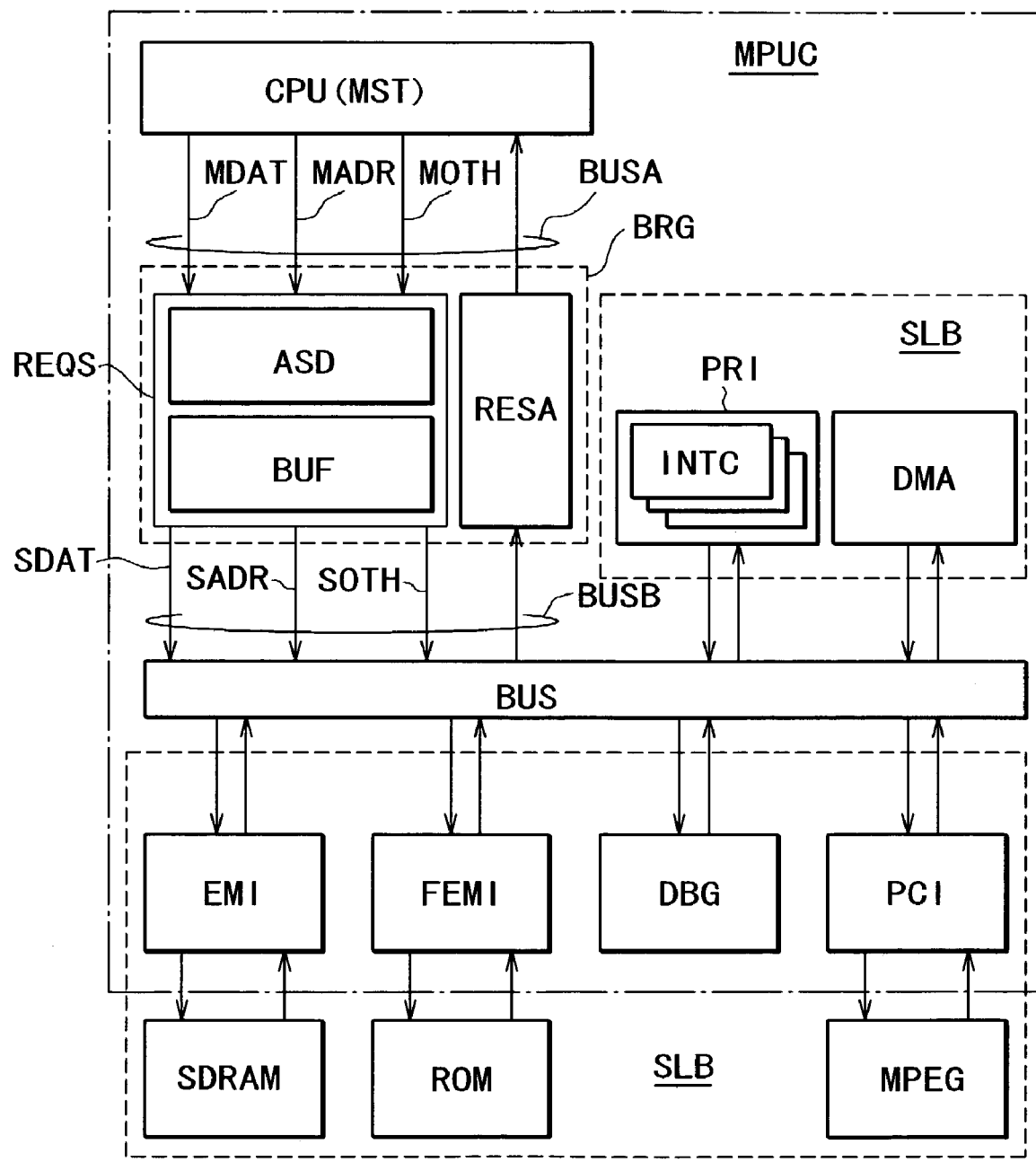
FIG. 2 is a block diagram showing a data processor according to one preferred embodiment of the present invention.

FIG. 2 is a block diagram specifically showing a data processor according to one preferred embodiment of the present invention. A micro-processor chip MPUC includes a CPU, a bus circuit BUS, a bus bridge circuit BRG for making protocol conversion between the CPU's bus BUSA and the bus circuit BUS, a debug circuit DBG which issues a request according to what is specified externally when debugging software, a direct memory access circuit DMA for transferring data without intervention of the CPU, an external memory interface EMI, a flash external memory interface FEMI, a PCI bus controller PCI and other peripheral circuits PRI such as an interrupt controller INTC. An SDRAM chip, a ROM chip and an MPEG chip are connected on the board onto which the microprocessor chip MPUC is connected.

From the perspective of the bus bridge circuit BRG, the CPU is the master circuit and the remaining circuits connected to the master circuit via the bus circuit BUS are bus slave circuits SLB. The CPU as the master circuit MST sends 32-bit data as master side data MDAT, 29-bit address as master side address MADR and master side other information MOTH including operation code, access size, etc., to the slaves SLB via the bus bridge circuit BRG. The CPU supports commands of access sizes of 8 bits, 16 bits, 32 bits, and 32 bytes.

On the other hand, the external memory interface EMI that is one of slave circuits SLB on the microprocessor chip MPUC has a register for exclusively accepting access in 64 bits. As for the other slave circuits SLB, some have a register for exclusively accepting access in 32 bits, some have a register for exclusively accepting access in 16 bits, and some have a register for exclusively accepting access in 8 bits.

In this embodiment, the bus bridge circuit BRG implements the access size control that allows the CPU to access the slave in 64 bits in addition to the access sizes supported by the CPU, namely 8 bits, 16 bits, 32 bits, and 32 bytes. This bus bridge circuit BRG includes a request controller REQS which passes a request from the CPU to the bus circuit BUS and a response controller RESA which transfers a response to the request from the bus circuit BUS to the CPU.

The request controller REQS will be described below. The request controller REQS includes an access size control unit ASD and a buffer unit BUF. The request controller REQS passes access requests for data in 8 bits, 16 bits, 32 bits and 32 bytes that are supported by the CPU to the bus circuit BUS and, in addition, when an access request for data in 64 bits is specified, converts data in 32 bits as master side data MDAT to data in 64 bits as slave side data SDAT which is output to the bus circuit BUS. "Access in 64 bits" that is recited in this embodiment means that all 64 bits are effective for access. On the contrary, in case of "access in 8 bits," only 8 bits of the 64 bits of the slave side data SDAT of 64 bit width are effective and the remaining bits are copies of the effective 8 bits or have invalid values. This is the same for recitations of "Access in 16 bits" or "Access in 32 bits."

Figure 3:
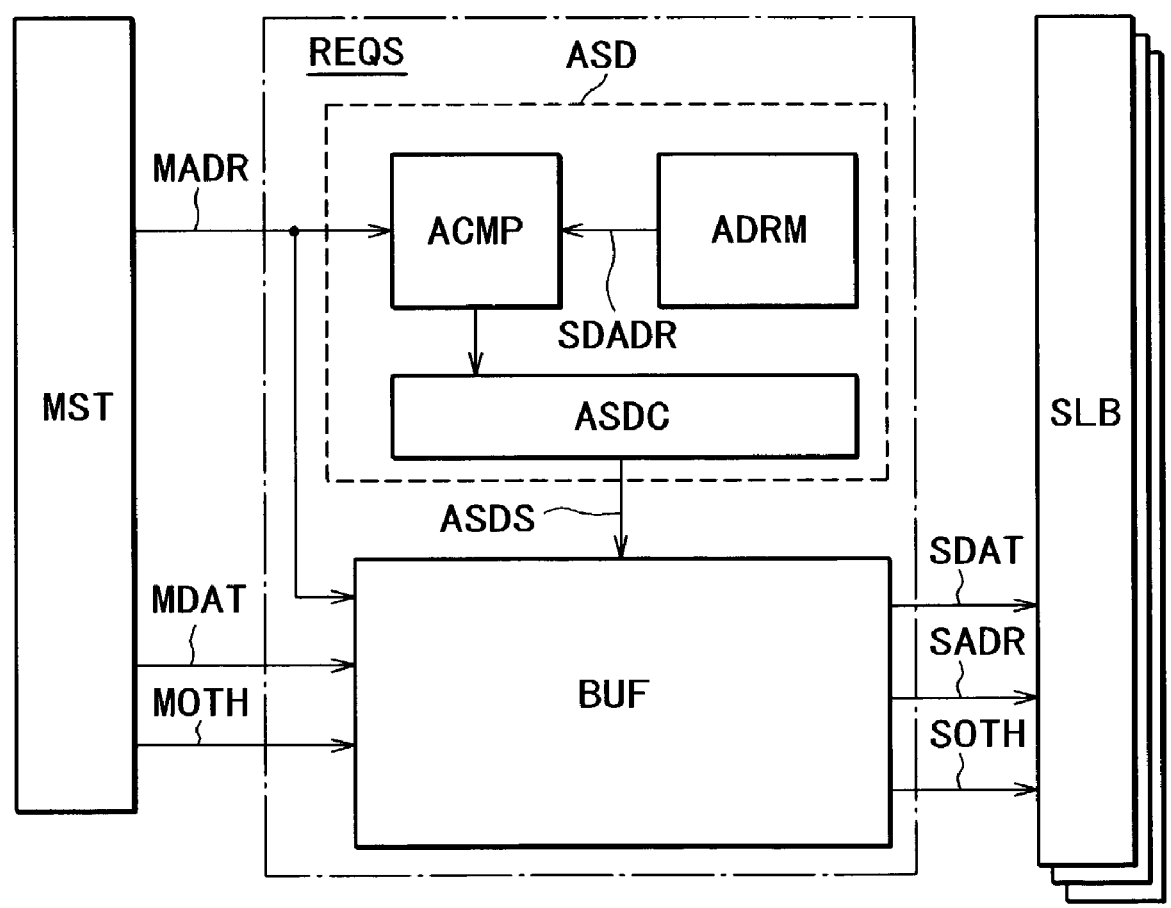
FIG. 3 is a block diagram showing a preferred example of a request controller REQS, including a master/slave relationship.

FIG. 3 is a block diagram showing the request controller REQS with a master/slave relationship. As shown in FIG. 3, the request controller REQS includes the access size control unit ASD and the buffer unit BUF that registers master side data MDAT, master side address MADR and master side other information MOTH which have been input from the master circuit MST. The access size control unit ASD outputs an access size designating signal ASDS to the buffer unit BUF. The buffer unit BUF outputs slave side data SDAT, slave side address SADR and slave side other information SOTH indicating the access size.

The access size control unit ASD in this embodiment includes an address memory ADRM for storing an access size setting address SDADR, an address comparator ACMP which compares the access size setting address SDADR and the address designated by master side address MADR and an access size controller ASDC which generates the access size designating signal ASDS that is passed to the buffer unit BUF based on the result of address comparison. In this configuration shown in FIG. 3, the access size setting address SDADR is assumed to be predetermined. In the alternative, it may be possible to configure an appropriate address set by the master circuit MST, as will be described later with reference to FIG. 14.

Specifically, the request controller REQS may be configured in four configurations according to different procedures for access size conversion. In the following, these procedures and associated REQS configurations will be described in order, using an illustrative case where an access size of 32 bits is converted to an access size of 64 bits.

(Access Size Conversion Procedure 1)

Figure 4:
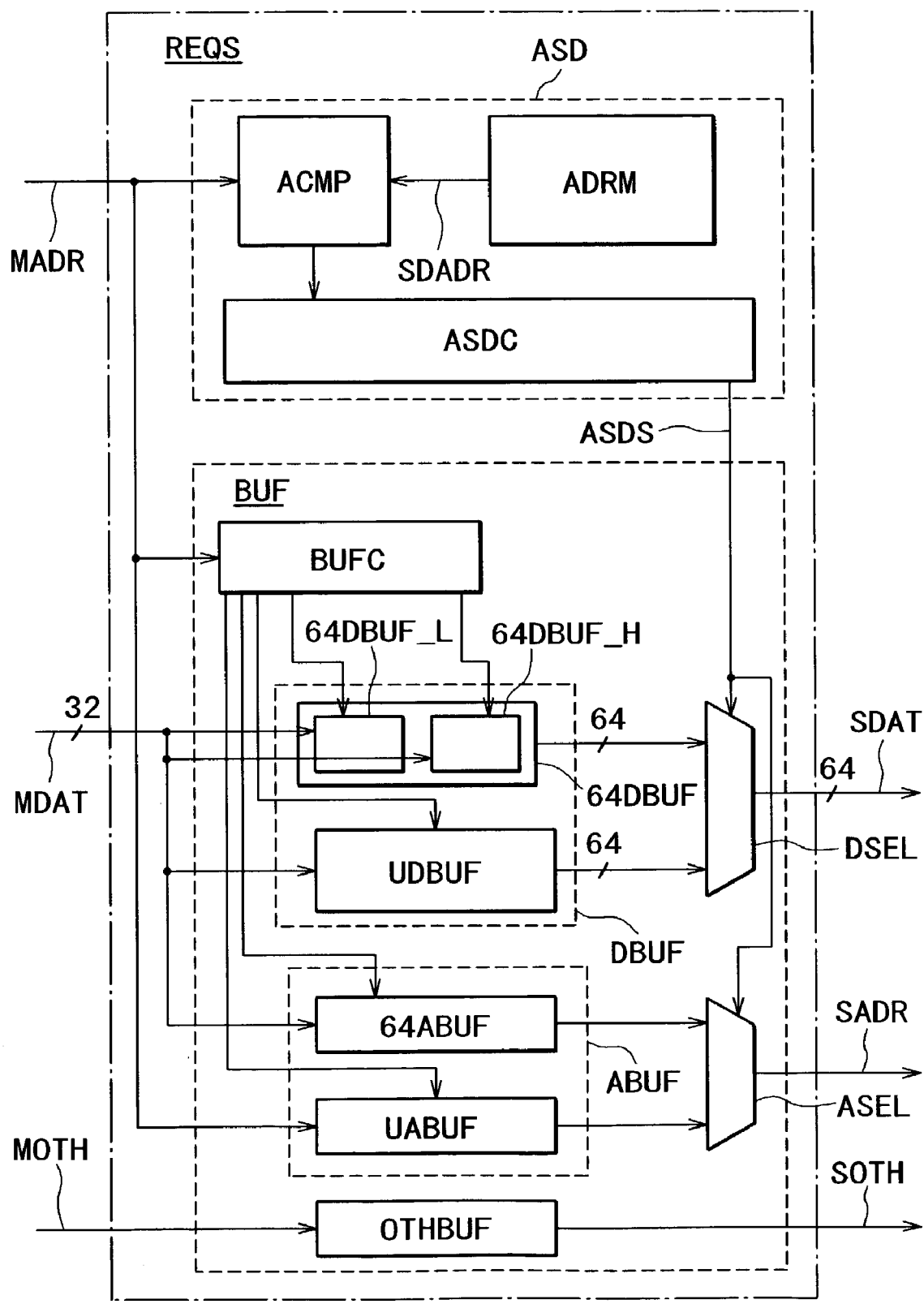
FIG. 4 is a block diagram showing a configuration example of the request controller REQS for implementing an access size conversion and setting procedure 1.
Figures 5A, 5B, 5C:
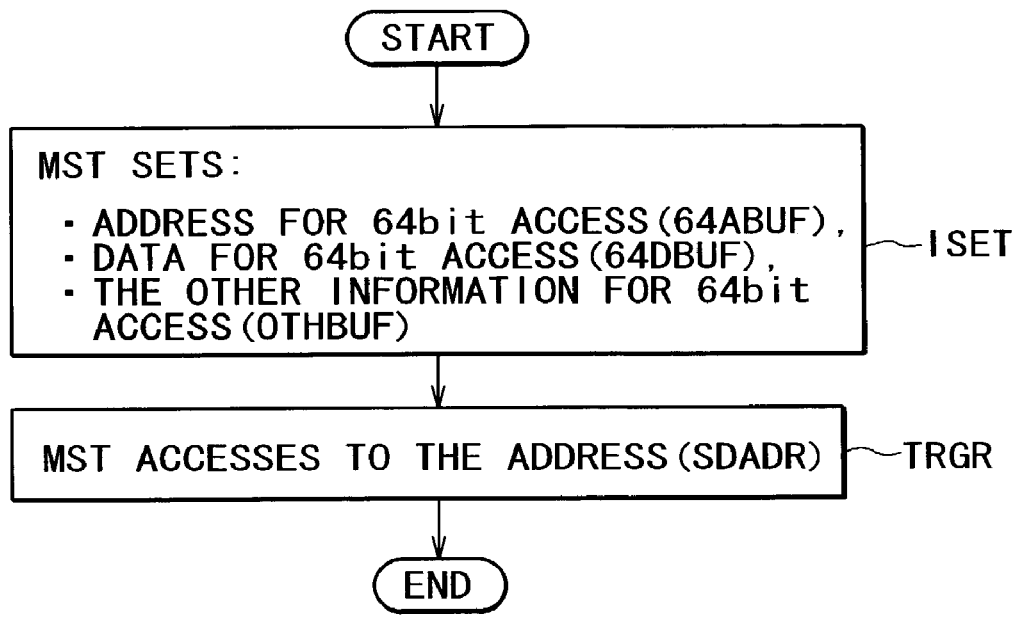
FIG. 5A shows a flowchart of the procedure 1.
FIG. 5B is an example program for writing by the procedure of FIG. 5A.
FIG. 5C is an example program for reading by the procedure of FIG. 5A.

A configuration example of the request controller REQS for implementing an access size conversion procedure 1 is shown in FIG. 4 and a flowchart of the procedure is shown in FIG. 5A with example programs in FIGS. 5B and 5C.

The request controller REQS, as shown in FIG. 4, includes the access size control unit ASD and the buffer unit BUF. The master side address MADR, the master side data MDAT in 32 bits and the master side other information MOTH are input to the request controller REQS from the CPU. The configuration of the access size control unit ASD is as described for FIG. 3. The buffer unit BUF includes a buffer controller BUFC, a data buffer DBUF, an address buffer ABUF, a buffer for other information OTHBUF, a data selector DSEL and an address selector ASEL.

The buffer controller BUFC stores an internal address table of registers attached to the buffer unit BUF. The buffer controller BUFC generates a directive signal to tell which data buffer to store the master side data MDAT, based on the master side address MADR and the internal address table associated with a program which will be described later.

The data buffer DBUF includes a first data buffer 64DBUF for access in 64 bits and a second data buffer UDBUF for normal access. The first data buffer 64DBUF includes a lower data buffer 64DBUF_L for the lower 32 bits and an upper data buffer 64DBUF_H for the upper 32 bits which are placed in tandem. The second data buffer UDBUF is used to store data that is to be transferred to/from the slave circuits and is normally accessible to the master circuit. Its output is in the form of 64 bits, but the substantial, effective data is only 32 bits or lower as previously described.

The address buffer ABUF consists of a first address buffer 64ABUF for access in 64 bits and a second address buffer UABUF for normal access. The address of a slave circuit accessible in 64 bits is input as master side data MDAT and it is stored into the first address buffer 64ABUF. A master side address MADR corresponding to the address of a slave circuit normally (i.e., without access size conversion) accessible to the master circuit is input and stored into the second address buffer UABUF.

Operation code, data size designating information, etc., are stored into the buffer for other information OTHBUF and usually do not need to be controlled for timing to store by the buffer controller BUFC.

The data selector DSEL selects either the first data buffer 64DBUF or the second data buffer UDBUF from which data will be output as the slave side data SDAT, according to the access size designating signal ASDS given to it from the access size controller ASDC. Similarly, the address selector ASEL selects either the first address buffer 64ABUF or the second address buffer UABUF from which address will be output as the slave side address SADR, according to the access size designating signal ASDS given to it from the access size controller ASDC.

The access size conversion procedure 1 will be explained, referring to FIG. 5A. When the master circuit MST needs to access the slave circuit SLB, the master circuit MST executes the program shown in FIG. 5B or 5C. The program of FIG. 5B or 5C is based on the flowchart of FIG. 5A.

First, in the data-setting step ISET, the slave side address SADR that must be output for access in 64 bits is stored into the first address buffer 64ABUF, the slave side data SDAT that must be output for access in 64 bits is stored into the first data buffer 64DBUF and operation code and other information are stored into the buffer for other information OTHBUF. However, when the master MST is accessing data in 64 bits to "read" the data, storing the slave side address SADR into the first address buffer 64ABUF and other information into the buffer for other information OTHBUF are to be performed. While, in the example of FIG. 5A, the address is stored before the data is stored, this sequence may be reversed.

Next, in the trigger step TRGR, the master circuit MST accesses the predetermined address. This predetermined address should coincide with the access size setting address SDADR. In this trigger step TRGR, the address comparator ACMP compares the master side address MADR from the master circuit MST and the access size setting address SDADR stored in the address memory ADRM and notifies the access size controller ASDC that these addresses agree. The access size controller ASDC controls the buffer unit BUF so that the slave side data and the slave side address for access in 64 bits which have been stored in the data-setting step ISET will be output from the buffer unit BUF to the bus circuit BUS.

Then, example programs for writing and reading data in 64 bits are shown in FIGS. 5B and 5C. Such example programs corresponding to access size conversion procedures 1 to 4 are shown in FIGS. 5B, 5C, 7B, 7C, 9B, 9C, 11B and 1C. In these examples, "MOVE. W VAL Rn" denotes that an address or data in 32 bits, represented by VAL, is stored into the n-th register Rn. "MOVE. W Rn@ (Rm+ #IMM)" denotes that data in 32 bits stored in the n-th register Rn is written to a register designated by the sum of the value stored in the m-th register Rm and an immediate value #IMM. "MOVE. W@Rn Rm" denotes that data stored in the register addressed by the value stored in the n-th register is read and written to the m-th register Rm. The above registers are attached to the CPU(master circuit).

Furthermore, the address of the lower data buffer 64DBUF_L of the first data buffer 64DBUF is described as a base address BASEADR. And the address of the upper data buffer 64DBUF_H is described as (the base address BASEADR+4). Further, the address of the first address buffer 64ABUF is described as (the base address BASEADR+16). On the other hand, it is possible that these addresses are described as specific addresses. The method shown in these examples, however, is effective in reducing the number of program steps. Also, the addresses of the registers that must be accessed when access in 64 bits is performed fall within a short range of the base address BASEADR.

In the example programs, DT64L denotes data of lower 32 bits of the data in 64 bits to be written by access, DT64H denotes data of upper 32 bits of the data in 64 bits to be written by access, and ADR64 denotes the address of the slave circuit SLB for access in 64 bits.

FIG. 5B is an example program for "writing" data in 64 bits that are set for access size.

By the execution of the line L1, first, the address of the lower data buffer 64DBUF_L, that is the base address BASEADR, is stored into a register R10. By the execution of line L2, data of lower 32 bits DT64L to be written by access are stored into a register R11. By the execution of line L3, the data once stored in the register R11, that is data of lower 32 bits DT64L, is stored into the lower data buffer 64DBUF_L with its address retained by the register R10.

Explaining these steps with reference to FIG. 4, the base address BASEADR stored in the register R10 is obtained as the master side address MADR and the data of lower 32 bits DT64L stored in the register R11 is obtained as the master side data MDAT. Then, the buffer controller BUFC compares the appropriate data in the internal address table and the base address BASEADR and issues an instruction to write the data of lower 32 bits DT64L to the lower data buffer 64DBUF_L.

By the execution of line L4, then, date of upper 32 bits DT64H are stored into the register R11. By the execution of line L5, the data once stored in the register R11, that is the data of upper 32 bits DT64H is stored into the upper data buffer 64DBUF_H with the address of (BASEADR+4). Explaining these steps with reference to FIG. 4, the buffer controller BUFC compares the appropriate data in the internal address table and the address (BASEADR+4) and issues an instruction to write the data of upper 32 bits DT64H to the upper data buffer 64DBUF_H.

By the execution of line L6, then, the address ADR64 of the slave circuit SLB for access in 64 bits is stored into the register R11. By the execution of line L7, the address once stored in the register R11, that is address ADR64, is stored into the first address buffer 64ABUF with the address of (BASEADR+16). Explaining these steps with reference to FIG. 4, the buffer controller BUFC compares the appropriate data in the internal address table and the address (BASEADR+16) and issues an instruction to write the address ADR64 of the slave circuit SLB for access in 64 bits to the first address buffer 64ABUF.

By the execution of line L8, then, the access size setting address SDADR is stored into a register R12. By the execution of line L9, the access size setting address SDADR once stored in the register R12 is output to the bus line as the master side address MADR. Hereon, a register R11 given on the line L9 is a dummy simply written to follow the program format. By the step of line L9, the address comparator ACMP detects a match between the master side address MADR and the access size setting address SDADR stored in the address memory ADRM and the access size controller ASDC outputs the access size designating signal ASDS. In response to the access size designating signal ASDS, the data selector DSEL and the address selector ASEL select the first data buffer 64DBF and the first address buffer 64ABUF respectively. Then, the data in 64 bits as access size is set and the slave circuit, which the data is to be written is identified. In addition, the operation code for "write" is output from the buffer for other information OTHBUF.

The program steps described by lines L1 to L7 are associated with the data-setting step ISET and the program steps described by lines L8 and L9 are associated with the trigger step TRGR.

FIG. 5C is an example program for "reading" data in 64 bits that are set for access size.

By the execution of the line L1, the base address BASEADR is stored into the register R10. By the execution of line L2, the address ADR64 of the slave circuit SLB for access in 64 bits is stored into the register R11. By the execution of line L3, the address ADR64 once stored in the register R11 is stored into the first address buffer 64ABUF with the address of (BASEADR+16). Explaining these steps with reference to FIG. 4, the buffer controller BUFC compares the appropriate data in the internal address table and the address of (BASEADR+16) and issues an instruction to write the address ADR64 of the slave circuit SLB stored in the register R11 to the first address buffer 64ABUF.

By the execution of line L4, then, the access size setting address SDADR is stored into the register R12. By the execution of line L5, the access setting address SDADR once stored in the register R12 is output to the bus line as the master side address MADR and the data at this address is accessed and read and the thus read data is written into the register R13. The read data is returned to the master circuit MST through the response controller RESA. Explaining these steps with reference to FIG. 4, the address comparator ACMP detects a match between the master side address MADR and the access size setting address SDADR stored in the address memory ADRM and the access size controller ASDC outputs an access size designating signal ASDS. In response to the access size designating signal ASDS, the address selector ASEL selects the first address buffer 64ABUF. Then, the slave circuit to be accessed is identified. In addition, the operation code for a "read" is output from the buffer for other information OTHBUF.

The program steps described by lines L1 to L3 are associated with the data-setting step ISET and the program steps described by lines L4 and L5 are associated with the trigger step TRGR.

The example program for reading differs from that for writing in that only the address for access in 64 bits is stored in the data-setting step ISET which is represented by the program steps of L1 to L3 and the target data is accessed and read by the program step L5 in the trigger step TRGR which is represented by the program steps of L4 and L5.

In the way described above, the access size control unit ASD enables the master circuit MST to access the slave circuit SLB and write or read data in size unsupported by the master circuit MST. No circuit modification is needed to the existing master circuit MST and slave circuit SLB hardware configuration. What to do is designing an access size control circuits and adding or altering comparatively small program codes of programs executed by the master circuit MST.

(Access Size Conversion Procedure 2)

Figure 6:
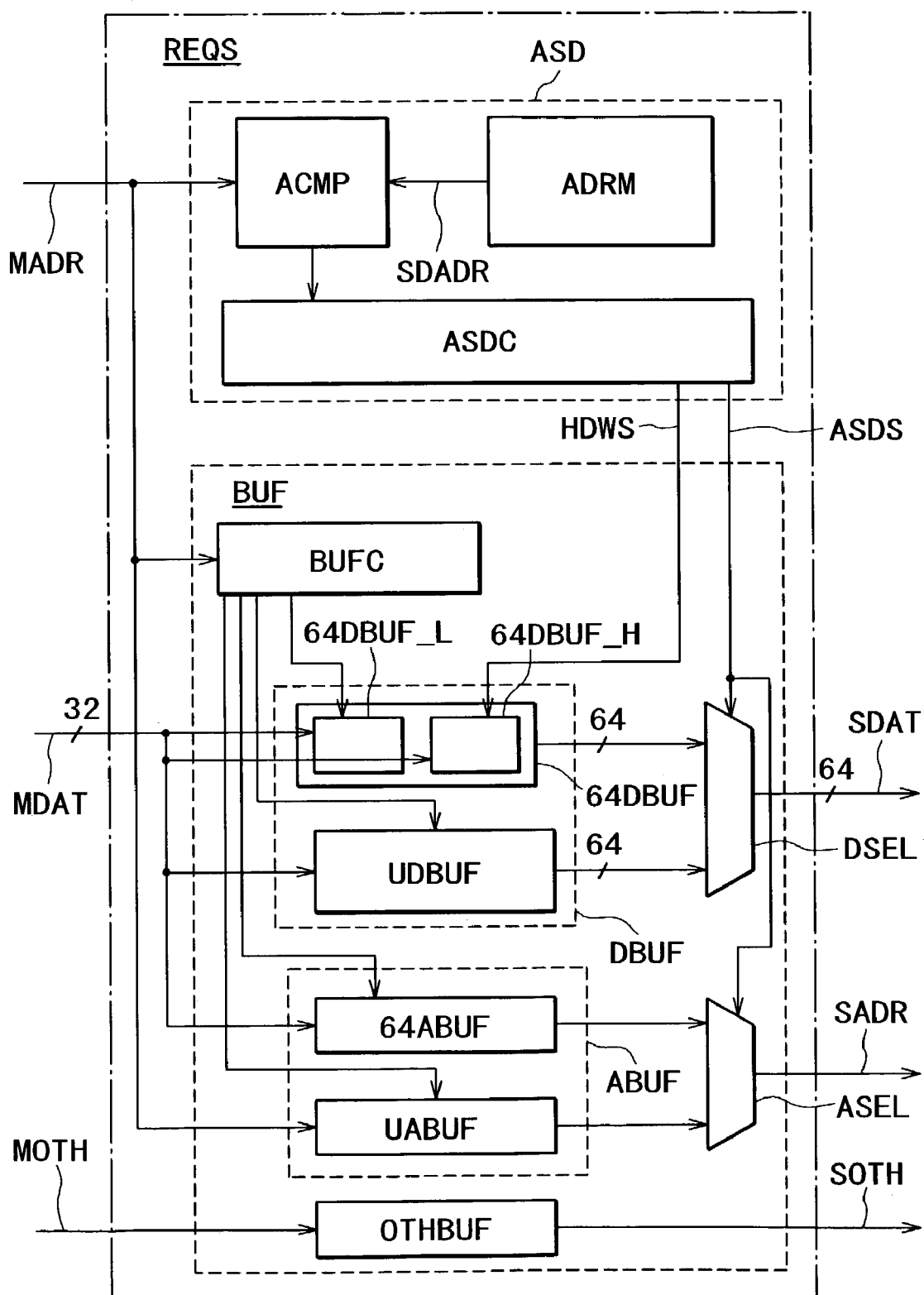
FIG. 6 is a block diagram showing another configuration example of the request controller REQS for implementing an access size conversion and setting procedure 2.

Another configuration example of the request controller REQS for implementing an access size conversion procedure 2 is shown in FIG. 6, and a flowchart of the procedure is shown in FIG. 7A with example programs in FIGS. 7B and 7C.

As is apparent when contrasting FIG. 6 with FIG. 4, difference of the request controller REQS configuration between FIGS. 6 and 4 is that the access size controller ASDC outputs a data write trigger HDWS to trigger writing the data of the upper 32 bits DT64H to the upper data buffer 64DBUF_H.

The access size conversion procedure 2 will be explained, referring to FIG. 7A. As is apparent by comparing FIG. 7A with FIG. 5A, only the data of the lower 32 bits DT64L is stored into the lower data buffer 64DBUF_L in the data-setting step ISET. The data of the upper 32 bits DT64H is stored into the upper data buffer 64DBUF_H concurrently with the output of the access size setting address SDADR in the trigger step TRGR. While, in the example of FIG. 7A, the address is stored before the data is stored, this sequence may be reversed.

FIG. 7B is an example program for "writing" data in 64 bits that are set for access size.

The lines L1 to L3 of FIG. 7B correspond to the lines L1 to L3 of FIG. 5B, and the lines L4 and L5 of FIG. 7B correspond to the lines L6 and L7 of FIG. 5B. Therefore, the repetitive examination is omitted. In the data-setting step ISET represented by the foregoing lines L1 to L5, the data of the lower 32 bits DT64L is stored into the lower data buffer 64DBUF_L and the address ADR64 of the slave circuit SLB for access in 64 bits is stored into the first address buffer 64ABUF.

By the execution of line L6, then, the data of the upper 32 bits DT64H is stored into the register R11. The lines L7 and L8 of FIG. 7B correspond to the lines L8 and L9 of FIG. 5B. The foregoing lines L6 to L8 represent the trigger step TRGR.

By the step of line L8, the address comparator ACMP detects a match between the master side address MADR and the access size setting address SDADR stored in the address memory ADRM and the access size controller ASDC outputs the data write trigger HDWS and the access size designating signal ASDS. In response to the data write trigger HDWS, the data of the upper 32 bits DT64H is written to the upper data buffer 64DBUF_H. In response to the access size designating signal ASDS, the data selector DSEL and the address selector ASEL select the first data buffer 64DBUF and the first address buffer 64ABUF respectively. Then, the data in 64 bits as access size is set and the slave circuit SLB to which the data is to be written is identified. The above access size controller ASDC receives the result of the address comparator ACMP and outputs the data write trigger HDWS and the access size designating signal ASDS at proper timing. In addition, the operation code for a "write" is output from the buffer for other information OTHBUF.

FIG. 7C is an example program for "reading" data in 64 bits that are set for access size. This example program is the same as the example program for reading shown in FIG. 5C.

In the access size conversion procedure 2, the data of the upper 32 bits DT64H is transferred when the master circuit MST accesses the access size setting address SDADR. This means the access size controller ASDC controls the timing of storing the above 32 bits into a part of the first data buffer 64DBUF. As the result, the number of times of data transfers from the master circuit MST to write data in 64 bits decreases by one. That is, the lines L4 and L5 of FIG. 5B are alternated by the line L6 of FIG. 7B.

(Access Size Conversion Procedure 3)

Figure 8:
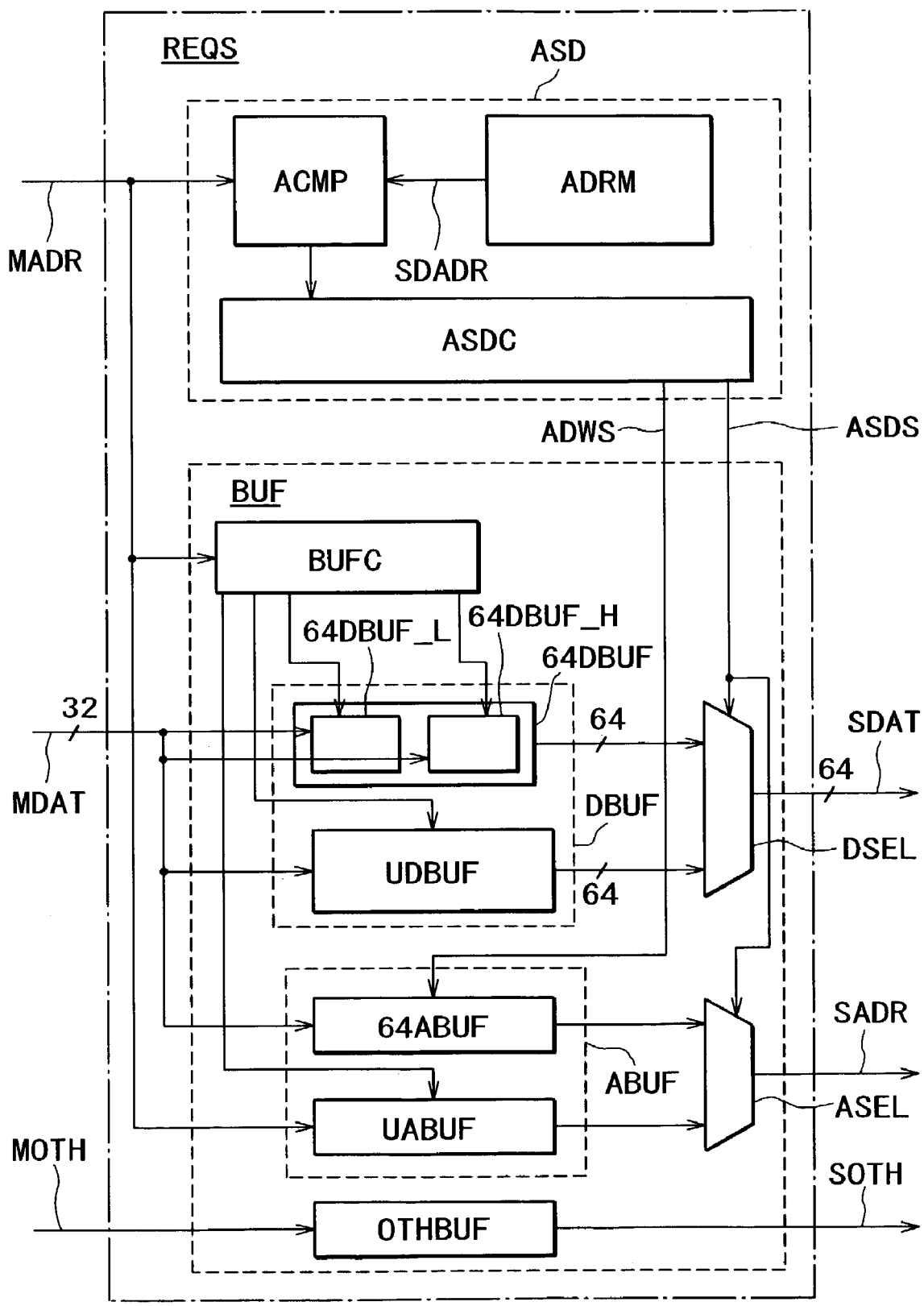
FIG. 8 is a block diagram showing yet another configuration example of the request controller REQS for implementing an access size conversion and setting procedure 3.

Another configuration example of the request controller REQS for implementing an access size conversion procedure 3 is shown in FIG. 8, and a flowchart of the procedure is shown in FIG. 9A with example programs in FIGS. 9B and 9C.

As is apparent when contrasting FIG. 8 with FIG. 4, difference between the request controller REQS configurations of FIGS. 8 and 4 is that the access size controller ASDC outputs an address write trigger ADWS to trigger writing the address ADR64 for access in 64 bits to the first address buffer 64ABUF.

The access size conversion procedure 3 will be explained, referring to FIG. 9A. As is apparent by comparing FIG. 9A with FIG. 5A, in the procedure 3, storing the address ADR64 into the first address buffer 64ABUF is not performed in the data-setting step ISET. Instead, the address ADR64 is stored into the first address buffer 64ABUF concurrently with the output of the access size setting address SDADR in the trigger step TRGR, which differs from the procedure 1. While, in the example of FIG. 9A, the address is stored before the data is stored, this sequence may be reversed.

FIG. 9B is an example program for "writing" data in 64 bits that are set for access size.

The lines L1 to L5 of FIG. 9B correspond to the lines L1 to L5 of FIG. 5B. Therefore, the repetitive examination is omitted. In the data-setting step ISET represented by the foregoing lines L1 to L5, the data of the lower 32 bits DT64L is stored into the lower data buffer 64DBUF_L and the data of the upper 32 bits DT64H is stored into the upper data buffer 64DBUF_H.

By the execution of line L6, then, the address ADR64 for access in 64 bits is stored into the register R11. The lines L7 and L8 of FIG. 9B correspond to the lines L8 and L9 of FIG. 5B. The foregoing lines L6 to L8 represent the trigger step TRGR.

By the step of line L8, the address comparator ACMP detects a match between the master side address MADR and the access size setting address SDADR stored in the address-memory ADRM and the access size controller ASDC outputs the address write trigger ADWS and the access size designating signal ASDS. By the address write trigger ADWS, the address ADR64 for access in 64 bits is written to the first address buffer 64ABUF. In response to the access size designating signal ASDS, the data selector DSEL and the address selector ASEL select the first data buffer 64DBUF and the first address buffer 64ABUF respectively. Then, the data in 64 bits as access size is set and the slave circuit SLB to which the data is to be written is identified. The above access size controller ASDC receives the result of the address comparator ACMP and outputs the address write trigger ADWS and the access size designating signal ASDS at proper timing. In addition, the operation code for a "write" is output from the buffer for other information OTHBUF.

FIG. 9C is an example program for "reading" data in 64 bits that are set for access size. This example program is the same as the example program for reading shown in FIG. 5C.

In the access size conversion procedure 3, the address ADR64 for access in 64 bits is transferred when the master circuit MST accesses the access size setting address SDADR. This means the access size controller ASDC controls the timing of storing the above address ADR64 into the first address buffer 64ABUF. As the result, the number of times of data transfers from the master circuit MST to write data in 64 bits decreases by one. That is, the lines L6 and L7 of FIG. 5B are alternated by the line L6 of FIG. 7B.

(Access Size Conversion Procedure 4)

Figure 10:
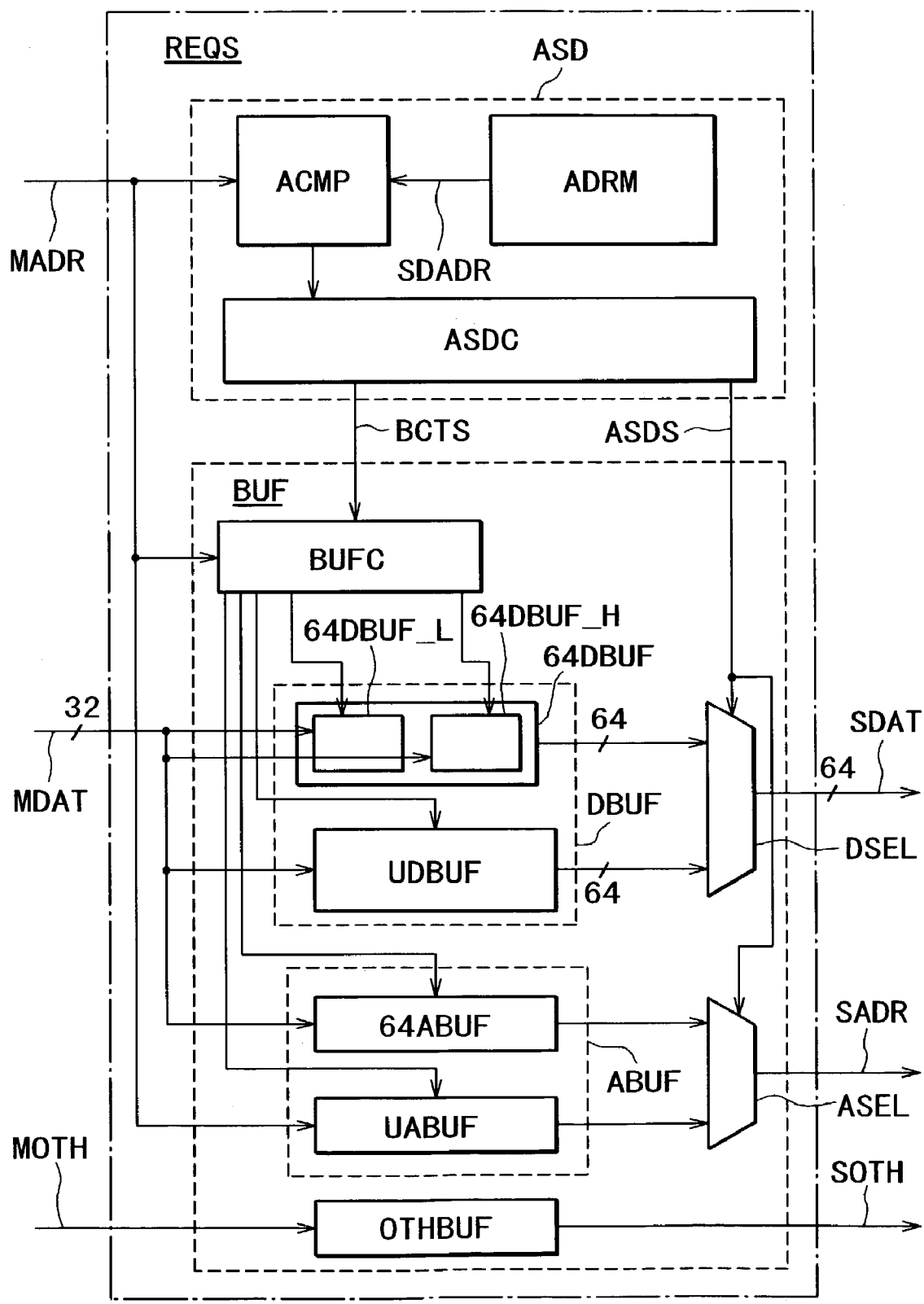
FIG. 10 is a block diagram showing a further configuration example of the request controller REQS for implementing an access size conversion and setting procedure 4.
Figures 11A, 11B, 11C:
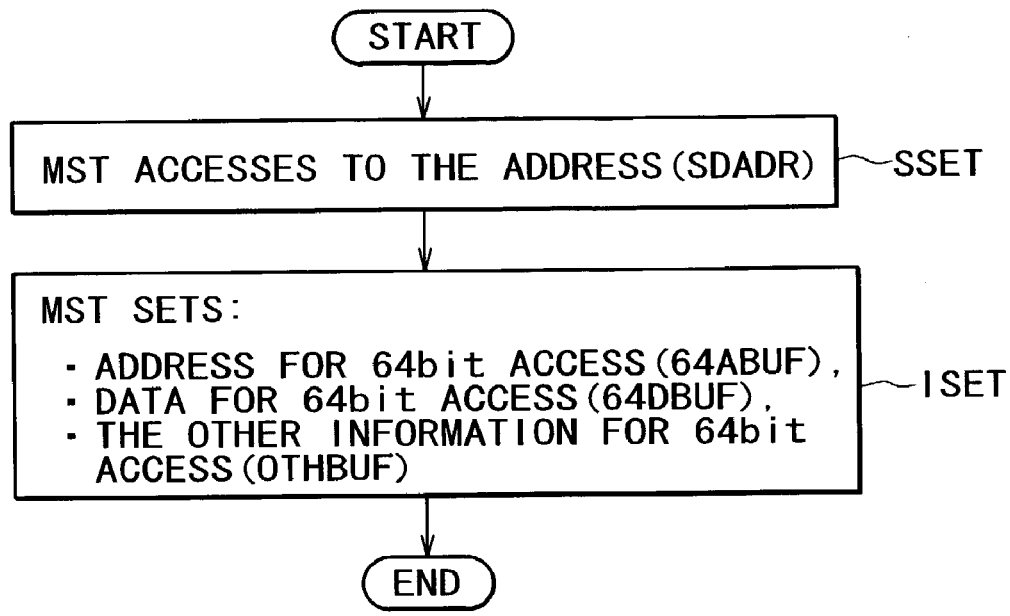
FIG. 11A shows a flowchart of the procedure 4.
FIG. 11B is an example program for writing by the procedure of FIG. 11A.
FIG. 11C is an example program for reading by the procedure of FIG. 11A.

A further configuration example of the request controller REQS for implementing an access size conversion procedure 4 is shown in FIG. 10, and a flowchart of the procedure is shown in FIG. 11A with example programs in FIGS. 11B and As is apparent when contrasting FIG. 10 with FIG. 4, difference between the request controller REQS configurations of FIGS. 10 and 4 is that the access size controller ASDC issues an trigger BCTS to trigger buffering of data and address for access in 64 bits.

The access size conversion procedure 4 will be explained, referring to FIG. 1A. In the procedure 4, unlike the described procedures 1 to 3, the size-setting step SSET is performed prior to the data-setting step ISET. In the size-setting step SSET, the address comparator ACMP compares the master side address MADR from the master circuit MST and the access size setting address SDADR stored in the address memory ADRM. If there is a match between both address values, the address comparator ACMP notifies the access size controller ASDC of the address match. On receiving this notification, the access size controller ASDC sends a trigger BCTS to the buffer unit BUF so that the buffer controller handles data, address and other information that are input in the next data-setting step ISET as those for access in 64 bits. After sending the trigger BCTS, the access size controller ASDC issues an access size designating signal ASDS by which the data selector DSEL and the address selector ASEL select the first data buffer 64DBUF and the first address buffer 64ABUF respectively.

In the data-setting step ISET, the master circuit MST sends data for access in 64 bits, an address for access in 64 bits and other information to the buffer unit BUF. However, when the master circuit MST is accessing the slave circuit SLB to read the data in 64 bits, it is to send only the slave side address SADR to the buffer unit BUF. The buffer unit BUF stores the above data, address, etc. as those for access in 64 bits into the appropriate buffers. With the access size designating signal ASDS received, when all the data in 64 bits, address, and information have been set in the appropriate buffers, the buffer unit outputs them to the bus circuit BUS.

FIG. 11B is an example program for "writing" data in 64 bits that are set for access size.

The lines L1 and L2 of FIG. 11B correspond to the lines L8 and L9 of FIG. 5B. By the step of line L2, the address comparator ACMP detects a match between the master side address MADR and the corresponding address value for size SDADR stored in the address memory ADRM and the access size controller ASDC issues a trigger BCTS to the buffer controller BUFC. In response to the access size designating signal ASDS sent at a proper time after the trigger BCTS, the data selector DSEL and the address selector ASEL select the first data buffer 64DBF and the first address buffer 64ABUF respectively.

The lines L3 to L9 of FIG. 11B correspond to the lines L1 to L7 of FIG. 5B. Therefore, the repetitive examination is omitted.

In short, the procedure 4 is arranged such that the trigger step TRGR in the procedure 1 is first performed as the size-setting step SSET and then the data-setting step ISET is performed.

FIG. 11C is an example program for "reading" data in 64 bits that are set for access size.

The lines L1 to L2 of FIG. 11C correspond to the lines L4 to L5 of FIG. 5C. Explaining the step of line L2, referring FIG. 10, the address comparator ACMP detects a match between the master side address MADR and the access size setting address SDADR stored in the address memory ADRM and the access size controller ASDC issues the trigger BCTS to the buffer controller BUFC. In response to the access size designating signal ASDS sent at a proper time after the trigger BCTS, the address selector ASEL selects the first address buffer 64ABUF. In addition, the operation code for a "read" is output from the buffer for other information OTHBUF.

The lines L3 to L5 of FIG. 11C correspond to the lines L1 to L3 of FIG. 5C. Therefore, the repetitive examination is omitted. Because the access size controller ASDC sends the access size designating signal ASDS to the address selector ASEL in time with the completion of the above steps of lines L3 to L5, the data at the address ADR64 for access in 64 bit can be accessed and read and the thus read data can be written to the register R13. The read data is returned to the master circuit MST through the response controller RESA.

In short, the procedure 4 is arranged such that the trigger step TRGR in the procedure 1 is first performed as the size-setting step SSET and then the data-setting step ISET is performed in the case of reading also.

(Setting Multiple Access Sizes)

This invention can be applied to enable the master circuit MST to access a slave circuit SLB and write or read data in 128 bits, 256 bits, or more in addition to 64 bits. In the following, two further examples that enable setting multiple access sizes will be described.

A further configuration example of the request controller REQS is shown in FIG. 12. This request controller REQS configuration example enables the master circuit MST to access the slave circuit and write or read data in both 64 bits and 128 bits. As is apparent when contrasting FIG. 12 with FIG. 4, an extra address buffer 128ABUF is added to the address buffer ABUF and an extra data buffer 128DBUF buffer is added to the data buffer DBUF. Further, the second data buffer for normal access UDBUF is modified to accommodate 128 bits. The first data buffer 64DBUF includes a lower data buffer 64L for the lower 32 bits and an upper data buffer 64H for the upper 32 bits, respectively. The extra data buffer 128DBUF includes an uppermost data buffer 128HU for the first 32 bits, an upper data buffer 128HL for the second 32 bits, a lower data buffer 128LU for the third 32 bits and a lowest data buffer 128LU for the last 32 bits. The buffer controller BUFC controls each data buffer, however, its illustration is simplified. The data selector DSEL selects one of the extra data buffer 128DBUF, the first data buffer 64DBUF and the second data buffer UDBUF and the address selector ASEL selects one of the extra address buffer 128ABUF, the first address buffer 64ABUF and the second address buffer UABUF.

In the address memory ADRM, a plurality of access size setting addresses SDADR are stored. In this example, two different addresses SDADR are shown: the address for size 1 (SDADR1) and the address for size 2 (SDADR2). For example, the address for size 1 (SDADR1) is assigned to access in 64 bits and the address for size 2 (SDADR2) is assigned to access in 128 bits. More addresses for access sizes may be assigned, as long as these access sizes corresponds to access sizes of at least one of the slave circuits. As long as this requirement is satisfied, a plurality of different access size setting addresses may be assigned to access in predetermined bits. The address comparator ACMP compares the master side address MADR and every access size setting address SDADR stored in the address memory ADRM. If an address value match occurs, the address comparator ACMP notifies the access size controller ASDC that the master circuit MST is accessing data in size corresponding to the matched access size setting address SDADR. The access size controller ASCD issues the access size designating signal ASDS to the buffer unit BUF. Overall access size procedure is done according to one of the above-mentioned procedures 1 to 4. This also applies to the following examples.

Figure 13:
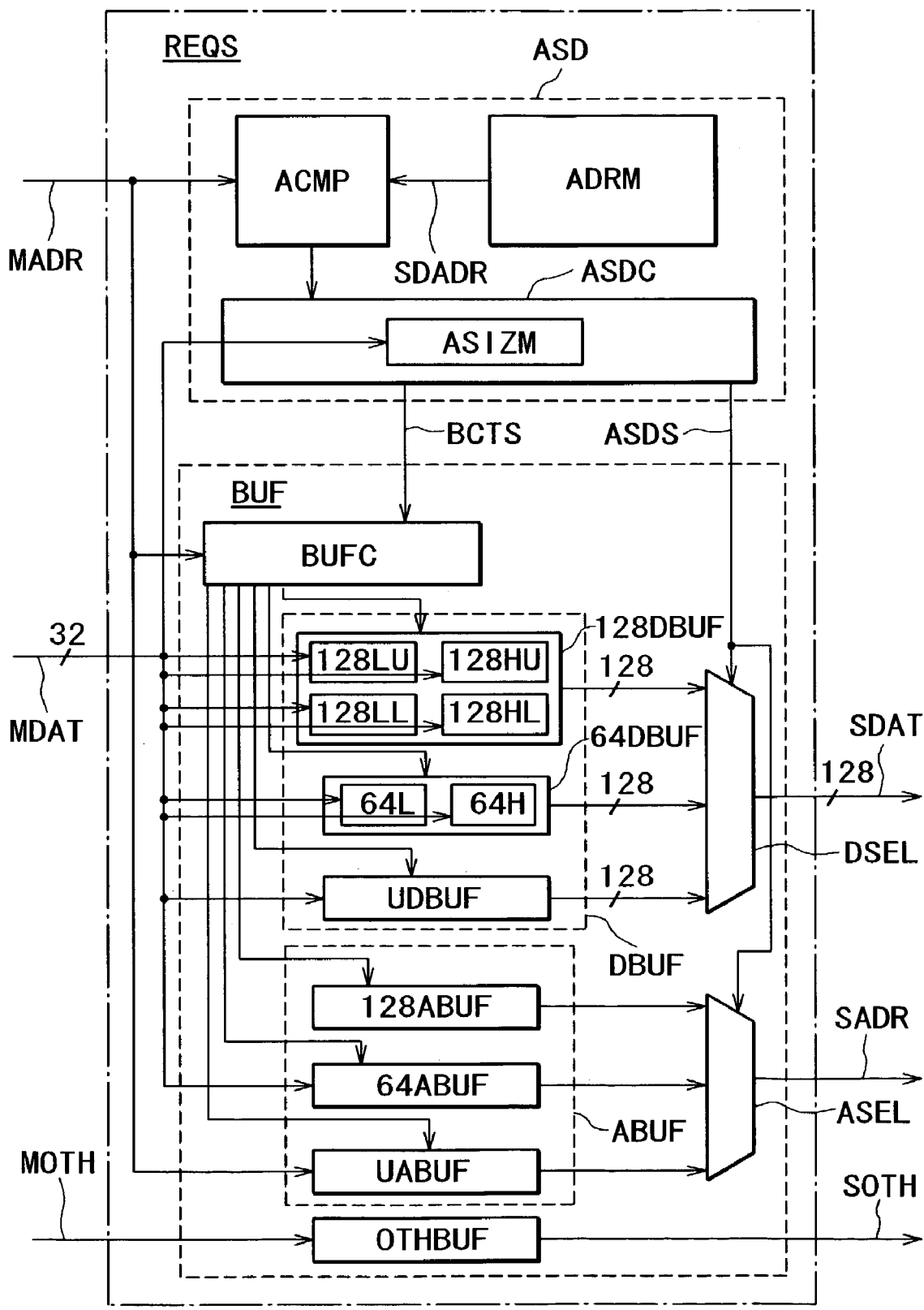
FIG. 13 is a block diagram showing a still further configuration example of the request controller REQS.

Another configuration example of the request controller REQS shown in FIG. 13 enables the master circuit MST to access the slave circuit SLB and write or read data in both 64 bits and 128 bits. The request controller REQS of FIG. 13 has the buffers for 128 bits as the request controller REQS of FIG. 12 does and includes an access size memory ASIZM in the access size controller ASDC. To the access size memory ASIZM, an access size setting data is supplied as the master side data MDAT. There are three procedures of using the request controller REQS of FIG. 13, which are different at the timing of supplying the access size setting data to the access size memory ASIZM.

The first procedure is transferring the access size setting data to the access size memory ASIZM when the master circuit MST accesses the access size setting address SDADR. The second procedure is transferring the access size setting data to the access size memory ASIZM after the master circuit MST accesses the access size setting address SDADR. The third procedure is storing the access size setting data in advance into the access size memory ASIZM before the master circuit MST accesses the access size setting address SDADR. In the third procedure, once the access size setting data has been set in the memory, any access size setting data is no longer needed for conversion to the same access size.

(Setting the Access Size Setting Address SDADR from the Master Circuit MST)

Figure 14:
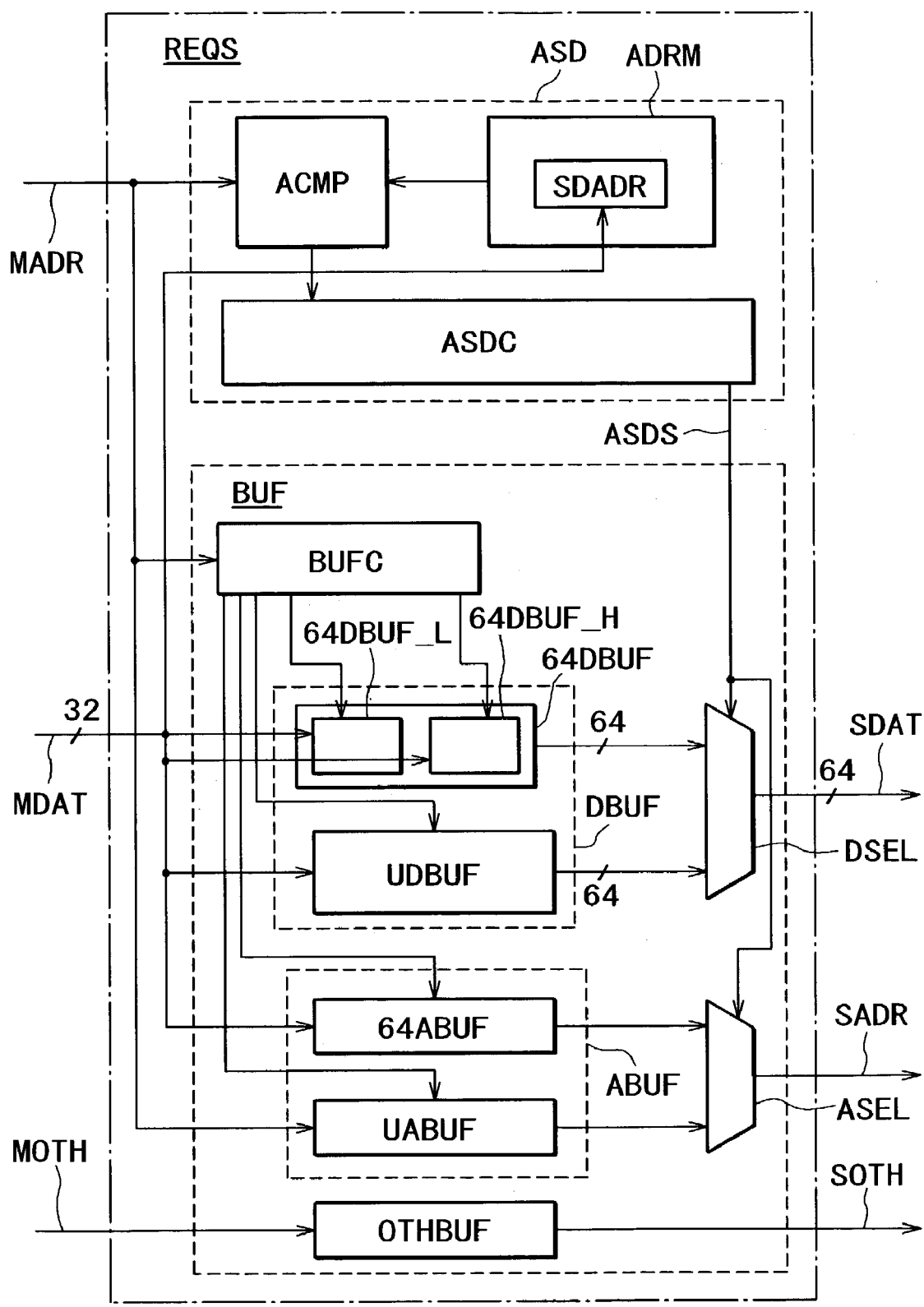
FIG. 14 is a block diagram showing a still further configuration example of the request controller REQS.

FIG. 14 shows a still further configuration example of the request controller REQS enabling setting an access size from the master circuit MST. In this, request controller REQS, the address memory ADRM includes a register to which an access size setting address SDADR as determined by the master circuit MST is written. In this case also, as explanation of FIG. 13, the timing of writing the access size setting address SDADR is varied and selectable.

(Application to Read-Modify-Write)

Figure 15:
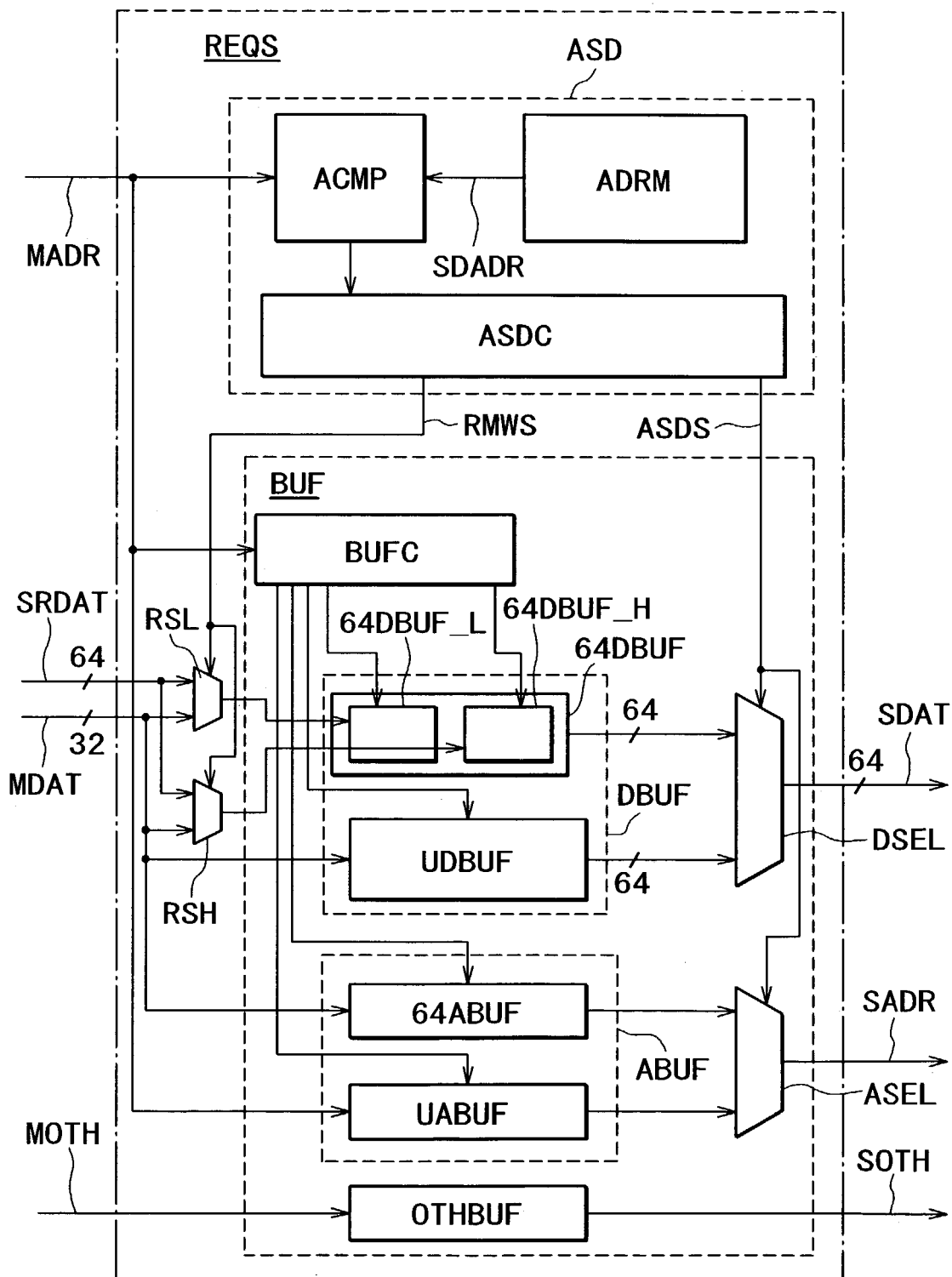
FIG. 15 is a block diagram showing a still further configuration example of the request controller REQS that can accommodate read-modify-write.

FIG. 15 shows a still further configuration example of the request controller REQS that can accommodate read-modify-write. This request controller REQS example includes selectors RSL and RSH so that a read data SRDAT from the slave circuit SLB instead of the master side data MDAT given from the master circuit MST can be stored into the first data buffer 64DBUF. When the address comparator ACMP detects a match between the master side address MADR and the access size setting address SDADR that indicates processing by read-modify-write, it issues address match signaling to the access size controller ASDC. In response to this signaling, the access size controller ASDC issues a read-modify-write signal RMWS by which the selectors RSH and RSL make changeover from the master side data MDAT in 32 bits to the read data SRDAT in 64 bits.

(Miscellaneous)

The present invention is not limited to the foregoing embodiments and can be carried out in modes that are more diverse. Some examples will be shown below.

In the foregoing embodiments, the access size control unit ASD converts access in 32 bits to access in 64 bits which is double the original access size or 128 bits which is four times the original access size. However, any greater multiple of 32 bits can be set for access size by adjusting the number of data buffers. For example, the access size control unit ASD may be arranged to convert access in A bits to access in bits that are n times the A bits.

The bus circuit BUSA between the master circuit MST and the request controller REQS and the bus circuit BUSB between the request controller REQS and the bus circuit BUS may have same bus width.

Although the described embodiments discussed only cases where the master circuit MST accesses the slave circuit SLB and write or read data in size unsupported by the master circuit MST, the data processor of the present invention, of course, processes data in size supported by the master MST in the same way done by conventional data processors. The feature of the invention that enables the master circuit MST to access the slave circuit SLB and write or read data in size unsupported by the master circuit MST does not affect conventional data processing functionality at all.

The foregoing invention has been described in terms of preferred embodiments. One of ordinary skill in the art would be enabled by such description to make various modifications to the preferred embodiments and still be within the scope and spirit of the present invention as defined in the appended claims.

What is claimed is:

1. A data processor comprising:
a master circuit which issues an access request;
a slave circuit which performs processing in response to the access request, and supports a predetermined data size which is not supported by the master circuit;
an intermediate circuit which converts an access size regarding the access request;
a first data bus;
a second data bus;
a first address bus; and
a second address bus,
wherein the intermediate circuit comprises:
  access size control unit and a buffer unit comprising a first data buffer, a second data buffer, a first address buffer, and a second address buffer, a data selector, and an address selector;
  wherein the first data buffer comprises a lower data buffer and an upper data buffer;
  wherein the data selector selects either the first data buffer or the second data buffer from which data is output to the second data bus;
  wherein the address selector selects either the first address buffer or the second address buffer from which address is output to the second address bus;
  wherein a maximum access size of the master circuit is n bit;
  wherein a maximum access size of the slave circuit is 2n bit or more:
  wherein the lower data buffer and the upper data buffer stores n bit data, which are transferred from the master circuit throuah the first data bus, respectively;
  wherein the first address buffer stores a first address, which is transferred from the master circuit through the first data bus;
wherein, when the access size control unit detects that a second address issued from the master circuit is the same as a predetermined address which is distinct from the first address after the lower data buffer and the upper data buffer store n bit data respectively and the first address buffer stores a first access address, the access size control unit outputs a signal; and
wherein the data selector outputs the data from the first data buffer to the second data bus and the address selector outputs the first address buffer to the second address buffer when the data selector and the address selector receive the signal.

2. The data processor according to claim 1,
wherein the access size control unit comprises an address memory which registers the predetermined address.

3. The data processor according to claim 2, wherein a plurality of the predetermined addresses are registered in the address memory, and each of the plurality of predetermined addresses corresponds to each of accesses of different size.

4. The data processor according to claim 2, wherein the predetermined address is designated by the master circuit.

5. The data processor according to claim 1, wherein the slave circuit is either one of an interface to an external device, a direct memory access circuit and a debug circuit.

6. A data processor comprising:
a master circuit corresponding to one of the circuit modules which issues an access request;
a first data bus;
a first address bus; and
an intermediate circuit which converts an access size of the access request and connects a slave circuit, which performs processing in response to the access request, through a second data bus and a second address bus;
wherein the intermediate circuit comprises:
the access size control unit and a buffer unit comprising a first data buffer, a second data buffer, a first address buffer, and a second address buffer, a buffer controller, a data selector, and an address selector;
wherein the first data buffer comprises a lower data buffer and an upper data buffer;
wherein the data selector selects either the first data buffer or the second data buffer from which data is output to the second address bus;
wherein the address selector selects either the first address buffer or the second address buffer from which address is output to the second data bus;
wherein a maximum access size of the master circuit is n-bit;
wherein a maximum access size of the slave circuit is 2n bit or more;
wherein the lower data buffer and the upper data buffer stores n bit data, which are transferred from the master circuit through the first data bus, respectively;
wherein the first address buffer stores a first access address, which is transferred from the master circuit through the first data bus;
wherein, when the access size control unit detects that a second address issued from the master circuit is the same as a predetermined address which is distinct from the first address after the lower data buffer and the upper data buffer stores n bit data respectively and the first address buffer stores a first access address, the access size control unit outputs a signal; and
wherein the data selector outputs the data from the first data buffer to the second data bus and the address selector outputs the first address buffer to the second address buffer when the data selector and the address selector receive the signal.

7. The data processor according to claim 6,
wherein the access size control unit comprises an address memory which registers a predetermined address.

8. The data processor according to claim 6,
wherein a first data bus which has a first bus width; and
wherein a second data bus which has a second bus width that is larger than the first bus width; and
wherein the master circuit issues the data corresponding to the access request through the first data bus, and the slave circuit receives the data through the second data bus.

9. The data processor according to claim 6, wherein the slave circuit is either one of an interface to an external device, a direct access circuit and a debug circuit.

* * * * *